US012782588B2

(12) United States Patent
Lee

(10) Patent No.: US 12,782,588 B2
(45) Date of Patent: Nov. 3, 2026

(54) METHODS AND APPARATUS FOR PROVIDING HIGH-PRECISION SPATIOTEMPORAL IDENTIFIER SERVICES

(71) Applicant: Sangjoo Lee, Seoul (KR)

(72) Inventor: Sangjoo Lee, Seoul (KR)

( * ) Notice: Subject to any disclaimer, the term of this patent is extended or adjusted under 35 U.S.C. 154(b) by 203 days.

(21) Appl. No.: 18/658,469

(22) Filed: May 8, 2024

(65) Prior Publication Data

US 2024/0302540 A1 Sep. 12, 2024

Related U.S. Application Data

(63) Continuation of application No. PCT/KR2022/019049, filed on Nov. 29, 2022.

(30) Foreign Application Priority Data

Nov. 30, 2021 (KR) ........................ 10-2021-0168543

(51) Int. Cl.
*G01S 19/51* (2010.01)
*G01S 19/08* (2010.01)

(52) U.S. Cl.
CPC .............. *G01S 19/51* (2013.01); *G01S 19/08* (2013.01)

(58) Field of Classification Search
CPC ................................ G01S 19/52; G01S 19/08
USPC ........................................................ 342/458
See application file for complete search history.

(56) References Cited

U.S. PATENT DOCUMENTS

| | | | | |
|---|---|---|---|---|
| 5,379,224 | A * | 1/1995 | Brown | G01S 19/09 73/178 R |
| 2009/0271112 | A1* | 10/2009 | Basnayake | G08G 1/161 701/469 |
| 2011/0238755 | A1* | 9/2011 | Khan | G06Q 10/40 709/204 |
| 2014/0184442 | A1* | 7/2014 | Large | G01S 19/41 342/357.42 |
| 2018/0102017 | A1* | 4/2018 | Brinig | G07F 17/0057 |
| 2018/0324740 | A1* | 11/2018 | Edge | H04W 64/00 |
| 2020/0132477 | A1 | 4/2020 | Averilla | |
| 2021/0037339 | A1* | 2/2021 | Ornelas | G01S 5/0284 |

FOREIGN PATENT DOCUMENTS

| | | |
|---|---|---|
| KR | 10-2006-0131707 A | 12/2006 |
| KR | 10-2009-0008663 A | 1/2009 |
| KR | 10-2009-0128225 A | 12/2009 |

(Continued)

*Primary Examiner* — Resha Desai
(74) *Attorney, Agent, or Firm* — LRK PATENT LAW FIRM

(57) ABSTRACT

Methods and apparatus for providing high-precision spatiotemporal identifier services are presented. These include repeatedly receiving low-precision client positions from clients; receiving an area of interest from a search client; identifying candidate clients using low-precision client positions within the area of interest and surrounding areas according to predetermined criteria; confirming high-precision spatiotemporal identifiers with the candidate clients; and confirming, with the search client, one or more target clients among the candidate clients using the high-precision spatiotemporal identifiers. These enable one person to communicate with another person at a specific location (area) without knowing or revealing any personal information.

36 Claims, 10 Drawing Sheets

(56) References Cited

FOREIGN PATENT DOCUMENTS

| | | | |
|---|---|---|---|
| KR | 10-2012-0008327 | A | 1/2012 |
| KR | 10-2012-0106820 | A | 9/2012 |
| KR | 10-1291720 | B1 | 7/2013 |
| KR | 10-2014-0068125 | A | 6/2014 |
| KR | 10-2015-0095589 | A | 8/2015 |
| KR | 10-2017-0097946 | A | 8/2017 |
| KR | 10-2020-0131137 | A | 11/2020 |

* cited by examiner

METHODS AND APPARATUS FOR PROVIDING HIGH-PRECISION SPATIOTEMPORAL IDENTIFIER SERVICES

CROSS-REFERENCE TO RELATED APPLICATIONS

This application is a continuation of International Application No. PCT/KR2022/019049, filed on Nov. 29, 2022, which claims priority to Korean Patent Application No. 10-2021-0168543, filed on Nov. 30, 2021, the entire disclosure of which is incorporated herein by reference for all purposes.

BACKGROUND OF THE INVENTION

1. Field of the Invention

The present invention relates to the field of real-time precise positioning systems and methods using GNSS (Global Navigation Satellite System).

2. Description of Related Art

Positioning methods using the GNSS satellite signals inevitably have poor accuracy due to various errors inherent in the GNSS satellite signals. For expansion into applications requiring higher reliability, GNSS correction service which improves positioning accuracy by using error correction information measured and calculated by a reference station is used.

For GNSS correction service, various types of GNSS error correction signals have been developed and are largely classified into SSR (State Space Representation) method and OSR (Observation Space Representation) method.

SSR-based error correction signals typically include error correction signal transmitted from SBAS (Satellite Based Augmentation System) satellites and PPP-RTK correction signal which is considered as a next-generation error correction signal.

OSR-based error correction signals typically include DGPS correction signal that supports meter level positioning using low-cost receivers and RTK (Real-Time Kinematic) correction signal that supports centimeter level high-precision positioning.

DGPS (Differential GPS) refers to various positioning methods that process GNSS observation data by differential positioning in a broad sense, but refers to an OSR method that supports positioning using GNSS code observation data in a narrow sense. RTK, which is a real-time precise positioning, uses carrier wave of GNSS (GPS) signals to calculate position. Therefore accuracy of RTK is relatively higher than accuracy of DGPS which uses only GNSS codes.

NRTK (Network-based Real Time Kinematic) connects multiple reference stations into a network, collects error correction signals from multiple reference stations placed near the user's position, and then comprehensively utilizes them to correct RTK errors suitable for the user's position. An error correction signal suitable for a terminal device is generated by interpolation. NRTK has the advantage of being able to support a wide area with limited reference station resources by virtue of this interpolation capability.

If the baseline distance between two points is less than 10 km, the relative positioning method can be used, which removes the common error contained in the satellite signals received at the two points and measures relative position between the two points using the double difference technique. This method has high precision and can be used for precise geodetic surveys, but if distance between two points exceeds 10 km, the premise that the error included in the satellite signal is common does not hold, so the precision is greatly reduced.

The RTK system of the relative positioning method generally uses a reference station that knows its precise position, a user terminal device which determines integer ambiguity of a double-differentiated carrier using data transmitted from the reference station and estimates the current position, and a data communication link for transmitting satellite observation data from the reference station to the user terminal device. However, if only relative position between two user terminal devices is needed, a dedicated local base station or a CORS (Continuously Operating Reference Station) whose precise position is known can be eliminated from the prerequisite.

SUMMARY OF THE INVENTION

In our daily lives, we often have conversations or come in contact with strangers. For example, while walking down the street, you can ask someone nearby for the location of a building you are looking for, or you can hand out flyers to people passing by. Contact with strangers is natural and common in real life. But if a stranger you're trying to contact is too far away to call by voice, there doesn't seem to be any way to contact him. It would be very convenient and productive if we could use cell phones to point out people 50 meters away and ask for directions or hand out leaflets. However, there are two obstacles to this innovation. First, it is impossible to connect a call because the other party's phone number or equivalent identifiers are unknown. Second, even if there is a way to receive an identifier related to a call, the other party's personal information may be exposed, causing problems with privacy and safety, unlike 'asking someone nearby for directions' mentioned above. Therefore, technological means are needed to make a call or deliver a message to a person in a specific location without revealing personal information.

Two or more people (or terminal) cannot coexist in a specific place and at a specific time. A high-precision spatiotemporal identifier is an identifier that combines very precisely measured position and time. Like a phone number, it belongs only to a specific person (or terminal) and can be used as the ID of that person (or terminal). What makes high-precision spatiotemporal identifiers different from regular IDs is that space-time combinations that an individual (or terminal) can have are infinite, so high-precision spatiotemporal identifiers are also infinite. For example, if a calling party wants to set up a call with a target party located 2 m to the right of the main entrance of a 10-story building 50 m ahead, the calling party can designate the place in which the building is located as an area of interest on a server, and then the server transmits candidate high-precision spatiotemporal identifiers of candidate parties (or terminals) found within the area of interest to the calling party. High-precision spatiotemporal identifiers allow the calling party to distinguish every person (or terminal) within the area of interest.

The calling party selects a target high-precision spatiotemporal identifier corresponding to the position of the target party among the candidate high-precision spatiotemporal identifiers and transmits it to the server. The server identifies the target party corresponding to the target high-precision spatiotemporal identifier and provides the calling party with one-way or two-way communication means starting from the calling party to the target party using already registered user information of the target party. Optionally, the server may provide the target party with means for communication starting from the target party to the calling party. During these processes, the server does not, in principle, transmit user information to either party.

The purpose of the present invention is to enable people to communicate with other people in a specific location (area) without revealing each other's personal information or, in some cases, intentionally exposing specific personal information. Target parties don't have to reveal their personal information to calling parties, so target parties can respond to the contact without risk, or they can also refuse the request to be contacted.

Store owners can distribute electronic leaflets non-face-to-face while looking out a window of their store without having to go out into the streets. The owners can choose who will receive electronic leaflets with just a few clicks, and can also distribute electronic leaflets to multiple people at the same time, which has the great advantage of saving labor costs and time. In addition, it can be widely used as an innovative marketing tool because product guidance messages can be distributed with different details depending on regions or strategically selected areas related to the product.

If your location is fixed for a certain period of time, you can receive calls at that location by registering that location and period on the server. This feature helps you receive orders using your undisclosed personal phone in a store that does not have a separate store phone.

In facilities such as soccer fields, baseball fields, and parks, messages can only be sent to users inside the facility, and specific messages can only be sent for specific areas in the facility, creating various guidance scenarios. These features will be a great help in planning concert scenarios to engage audiences, such as live music performances.

Newspaper and broadcast reporters can contact participants or someone near the scene of an incident and quickly report key information as soon as they are aware that a particular event has occurred, which will revolutionize the news production process.

Accidents can be prevented by contacting people who are at risk of various safety accidents or crimes, such as those who dropped their wallets on the street and those who are in cars with apparent tire problems. Additionally, the present invention will greatly contribute to increasing the level of public safety in society because it can immediately guide people around accident scenes.

Furthermore, the present invention will prevent economic crimes such as voice phishing and greatly contribute to transaction safety by providing a method to confirm the actual position of a transaction (communication) counterparty and constantly check whether the transaction (communication) counterparty has not changed.

As described above, the present invention will provide a technical foundation that will bring about various innovations in a fairly wide range of fields, including living convenience, marketing, media, culture, and safety.

DETAILED DESCRIPTION OF THE INVENTION

Specific structural or functional descriptions of the embodiments disclosed in the specification or application of the present invention are for illustrative purpose only and do not limit the present invention. Descriptions of technical contents that are well known in the technical field to which the present invention pertains and are not directly related to the present invention will be omitted.

The present invention introduces the concept of high-precision spatiotemporal identifier and presents a method for providing communication means based on it. A high precision data that combines a measured position and the corresponding measurement time and can distinguish one person (terminal) from others (terminals) is defined as a high-precision spatiotemporal identifier. The precision of relative positioning RTK (Real-Time Kinematic) can achieve the level of 1 to 2 cm, so it is very suitable as a positioning method that supports high-precision spatiotemporal identifiers. In one embodiment of the present invention, relative positioning RTK is applied.

High-precision spatiotemporal identifiers may be transmitted with the temporal component omitted only if communication delay between the server and a client is small enough to not cause significant loss in identification. This works because the loss after restoring temporal components on the receiving side does not affect identification. Additionally, high-precision spatiotemporal identifiers can be encrypted and transmitted to prevent or detect theft or forgery.

In order to communicate with a stranger, you must first go through the process of selecting the stranger among other people nearby. Analyzing the process of selecting a stranger in everyday life, we find that the conversation initiator searches his surroundings within a certain range and selects one among the people in search results according to his own criteria (e.g., the closest person). In a similar manner, the present invention provides a method in which a communication initiator searches for candidates for communication partners within a certain range specified using an electronic map or text, and selects a specific person from the search results.

The configuration of the present invention is based on the server-client model, where the server stores user information provided upon client registration. A client physically refers to a person or terminal, and functionally refers to software installed on the terminal. A communication initiator client requesting a search is called a search client, and the communication counterpart client targeted by the search client is called a target client. In order for a search client to select a target client from an electronic map, eligible candidate clients must first be displayed on the electronic map. The position information of the candidate client is provided by the server.

Figure 1A:
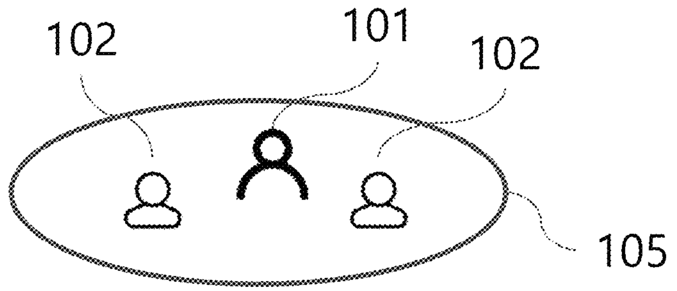
FIGS. 1A and 1B are conceptual diagrams illustrating an area of interest.
Figure 1B:
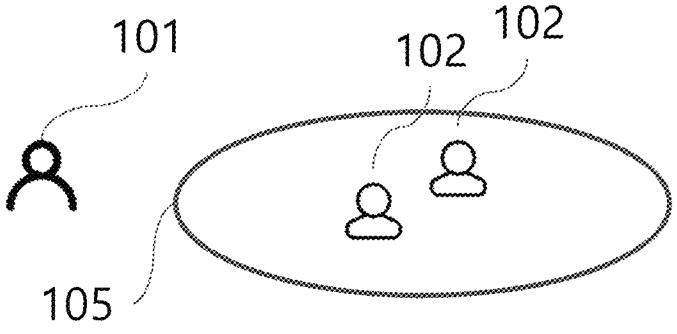

In order for the server to perform a search, the concept of an area of interest 105 indicating a search range on a map can be utilized, as shown in FIGS. 1A and 1B. The concept of an area of interest is useful because it is inefficient for the server to always prepare high-precision positions for all clients as it requires high computing power and communication cost. The server 103 only needs to perform a high-precision spatiotemporal identifier search in the area of interest 105 designated by the search client. Of course, if the total number of clients is small or the server has excellent computing power, a full search is possible. As an embodiment of the present invention, a scenario is possible in which the search client 101 designates as an area of interest 105 the minimum area in which the target clients may exist, and the server searches for candidate clients 102 limited to the area of interest and confirms a high-precision spatiotemporal identifier. As another embodiment of the present invention, after searching all clients and securing high-precision spatiotemporal identifiers, the server provides to the search client 101 only the high-precision spatiotemporal identifiers of candidate clients 102 located within the area of interest 105 designated by the search client 101. As another embodiment of the present invention, the server searches all clients to secure high-precision spatiotemporal identifiers and then provides the high-precision spatiotemporal identifiers of all clients to the search client 101 at the request of the search client 101. Although the present invention does not limit the area of interest 105 to essential elements, the following description will be based on a scenario in which the area of interest 105 is used to search for a candidate client.

The area of interest 105 may be a nearby area that includes the search client 101, as shown in FIG. 1A, or may be remote areas that does not include the search client 101, as shown in FIG. 1B. A remote area is advantageous for including clients located far away, because excessively enlarging the nearby area to include distant target clients increases the burden on the server for verification of high-precision spatiotemporal identifier and complicates the task of selecting target clients. Therefore, the purpose of the remote area of interest is different from that of enlarging and displaying a portion of the nearby area, and work processes involved vary greatly.

In order for the server to search for a candidate client in the area of interest 105 and confirm a high-precision identifier, it must first secure approximate information about which clients are located inside or outside the area of interest 105. To this end, a structure that divides precision of position information into several levels is applied, and below, as an embodiment of the present invention, a case where precision of position information is divided into a low-precision level and a high-precision level is presented.

Figure 2:
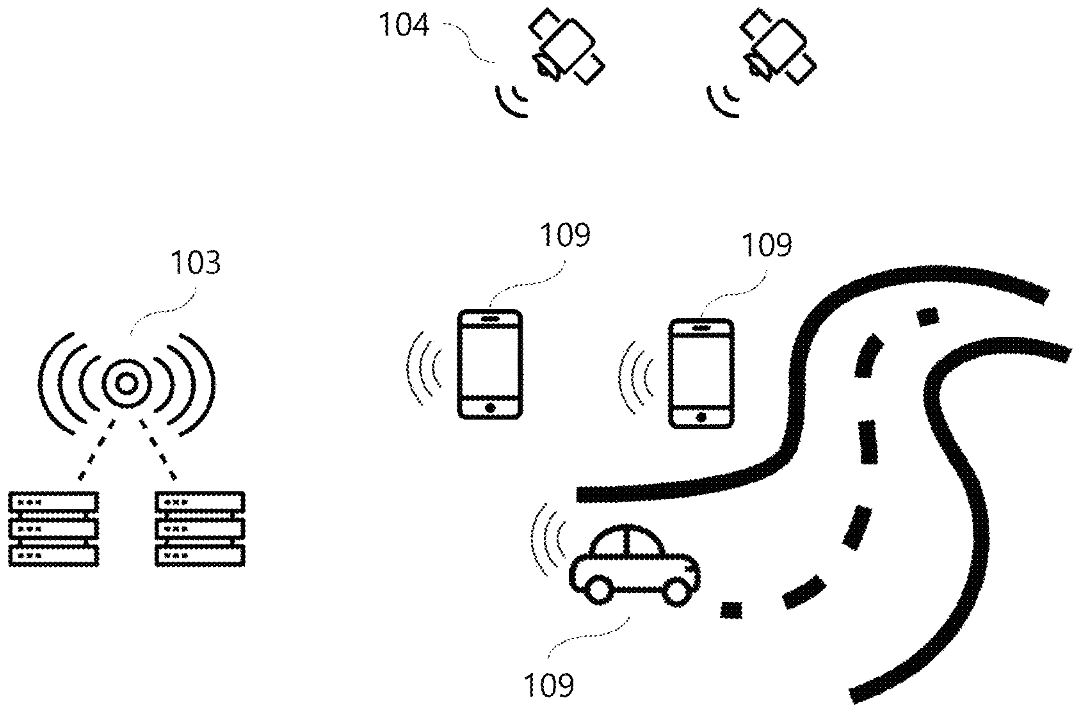
FIG. 2 is a conceptual diagram illustrating a process for collecting low-precision client positions.

Clients such as smartphones can individually calculate their single point position using GNSS (Global Navigation Satellite System), and clients with an Inertial Navigation System (INS) can additionally interpolate their single point position. Although this low-precision single point positioning contains a relatively large error, it is sufficient to be used for the purpose of determining approximate positions of clients. As shown in FIG. 2, each client 109 may periodically transmits individual low-precision client positions to the server 103. The transmission cycle can be adjusted considering the capability of the server 103 and transmission cost. Additionally, the client 109, which moves at a high speed, such as a vehicle, may transmit its individual position to the server whenever its new distance moved exceeds a predetermined value, independently of the above cycle. Clients may optionally be requested by the server to send their single point positions to the server.

Since the single point position of each client transmitted in this way lacks accuracy and precision, it may be considered that the server searches for candidate clients in an area wider than the area of interest by a predetermined standard. Of course, this option has the side effect of generating unwanted noise by including clients whose actual positions are outside the area of interest, but it can eliminate the fatal error of missing candidate clients whose actual positions are within the area of interest.

Figure 3A:
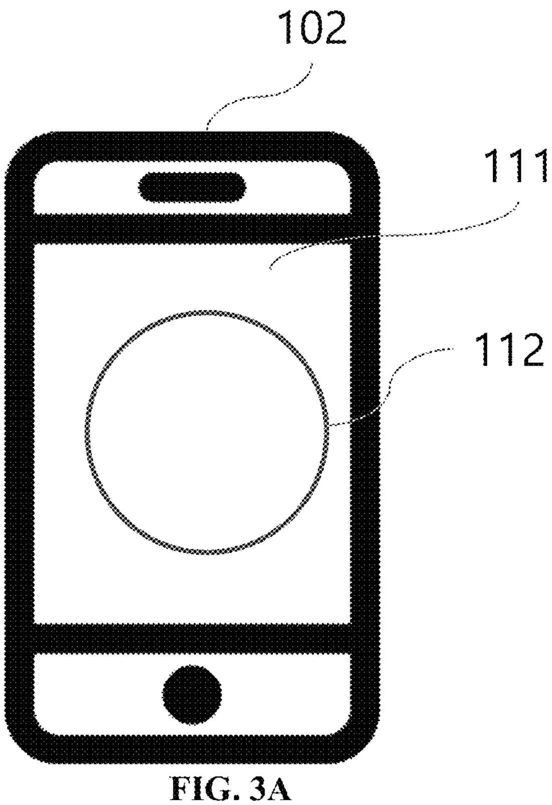
FIGS. 3A and 3B are conceptual diagrams illustrating the designation of an area of interest.
Figure 3B:
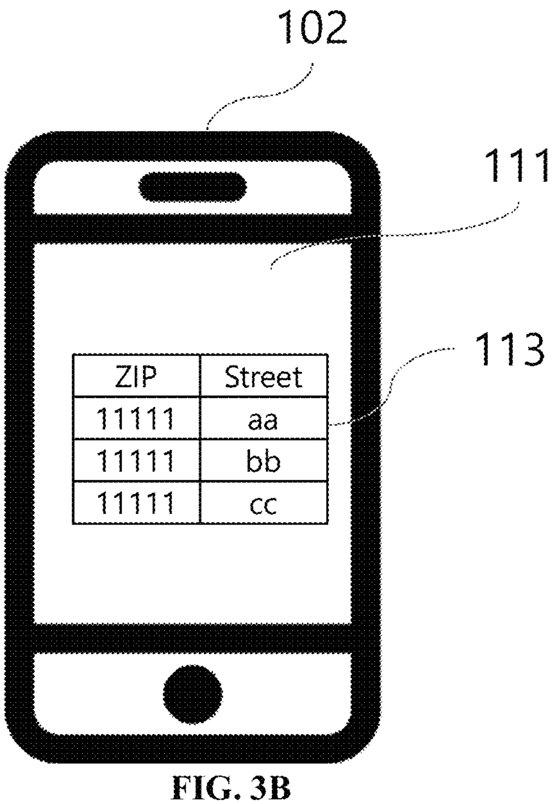

In order for the search client to designate the area of interest 105, the search client can use graphical means on an electronic map, as shown in FIG. 3A, or text means using the name of an administrative district, as shown in FIG. 3B. In the former case, the entire display 111 of the client can be designated as the area of interest 105, a shape 112 such as a triangle, square, or circle can be designated within the display 111 and/or an arbitrary shape drawn with a finger or electronic pen, etc. can be designated. In the latter case, top-down methods for hierarchical administrative districts or the search function can be used. In these ways, the area of interest 105 designated by the search client is transmitted to the server.

Figure 4:
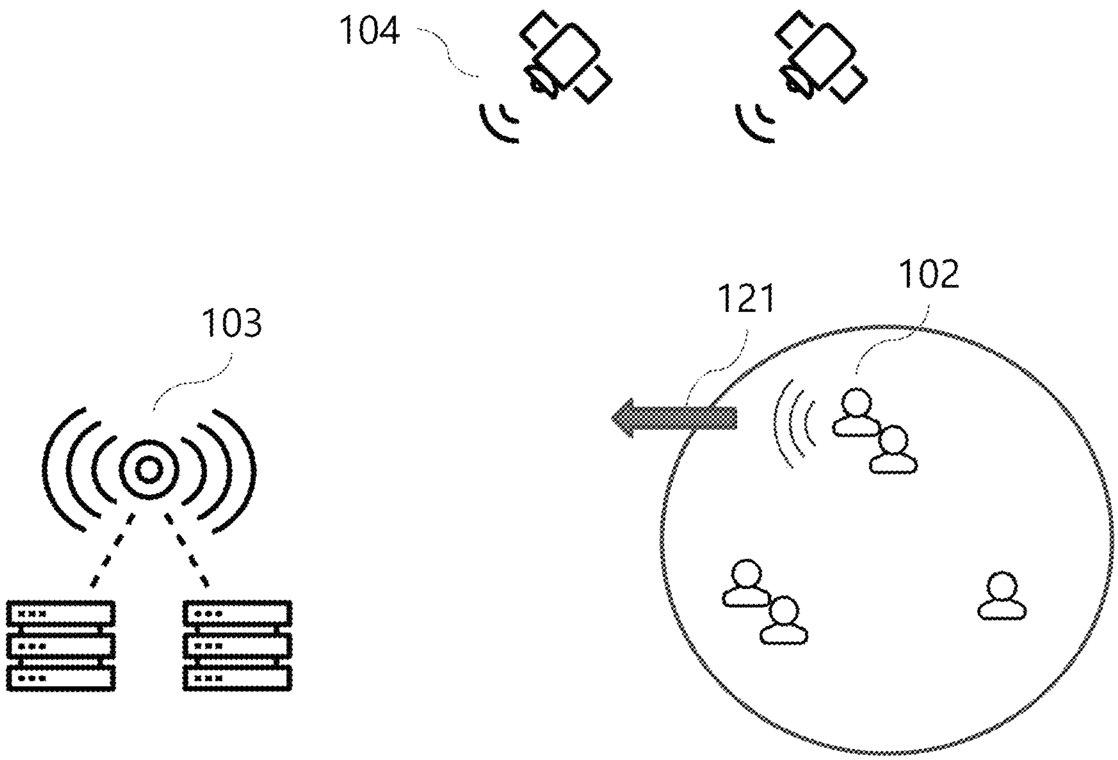
FIG. 4 is a conceptual diagram illustrating a process for confirming a high-precision spatiotemporal identifier of a candidate client.

After receiving and confirming the area of interest 105, the server determines a set of candidate clients using the already collected individual position of each client. Of course, as described above, a set of candidate clients can be determined by expanding the area of interest by a predetermined standard. When a set of candidate clients is determined, as shown in FIG. 4, the server 103 can requests and receives satellite observation data from each candidate client, then performs a relative positioning RTK algorithm to calculate a high-precision spatiotemporal identifier for each client, or a high-precision spatiotemporal identifier that is the output of individually performing a relative positioning RTK algorithm from each candidate client. In general, bottlenecks may occur when the relative positioning RTK algorithm is performed on the server, so it may be advantageous to perform relative positioning RTK algorithm on each candidate client.

Nevertheless, when the server directly calculates high-precision positions of candidate clients, the most basic way to perform the relative positioning RTK algorithm is to calculate the distance vector between an RTK reference station and each client.

However, if the distance between the RTK reference station and the area of interest is far, a method of determining a representative client among candidate clients and first obtaining the distance vectors between the representative client and the remaining clients may be considered. This is because, if the measurement positions of the two satellite observation data that the relative positioning RTK algorithm receives as input are separated by a certain distance or more, satellite signal errors inherent in the two satellite observation data are not substantially the same, causing the problem that the signal errors cannot be removed clearly using the difference method. In most cases, the distance between candidate clients within the area of interest is smaller than the distance between the RTK reference station and each candidate client, so it may be advantageous to first obtain the distance vectors between candidate clients within the area of interest. Next, the distance vector between an RTK reference station and the representative client is obtained and the coordinates of the RTK reference station are added to derive the position of the representative client, so the high-precision positions of all candidate clients are sequentially derived. The representative client can be selected as a candidate client that is as close to the RTK reference station as possible or can be selected as a candidate client with good satellite observation data quality. This method has the advantage of reducing the risk of making mistakes in determining the target client because relative position distribution among candidate clients in the area of interest becomes more accurate.

Furthermore, if an RTK reference station does not exist or is temporarily unavailable, the server first performs single a point position algorithm for each candidate client to obtain an individual position, and then averages the individual positions to obtain an average single point position. Next, the relative positioning RTK algorithm is performed between the representative client, which is one of the candidate clients, and each of the remaining candidate clients to obtain individual distance vectors between the representative client and each of the remaining candidate clients. The positions of all candidate clients can be displayed by adding the representative position of the representative client to the individual distance vectors, and the representative positions can be obtained under the assumption that averaging the positions of all candidate clients will result in the same value as the average single point position. Of course, the representative position obtained in this way may have some error from the actual representative position, but the larger the number of candidate clients, the smaller the error, and it can be a good alternative in situations where an RTK reference station is not available. Once the representative position is obtained, the positions of the remaining candidate clients can be calculated by adding their individual distance vectors.

Figure 5:
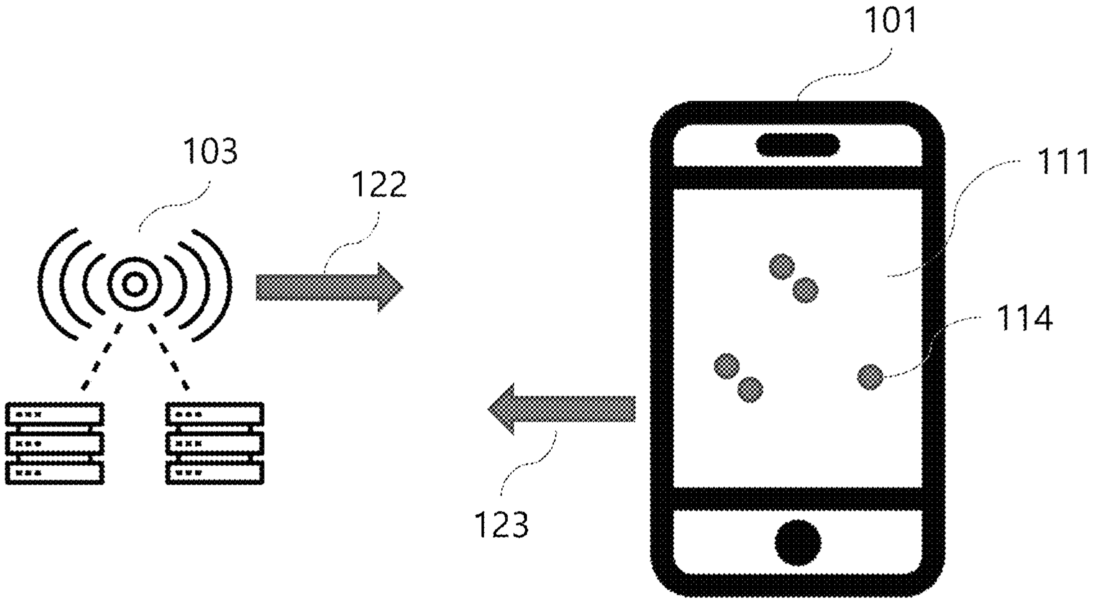
FIG. 5 is a conceptual diagram illustrating a process for confirming a target client.

When high-precision identifiers of candidate clients are secured, as shown in FIG. 5, the server transmits the high-precision spatiotemporal identifiers 122 to the search client 101. High-precision positions 114 of candidate clients are displayed along with a map on the display 111 of the search client 101, and one or more high-precision spatiotemporal identifiers 123 among them determined to be closest to the target client is/are returned to the server 103. The server identifies target client(s) corresponding to the one or more high-precision spatiotemporal identifiers 123.

However, if a problem occurs in the process of returning the single high-precision spatiotemporal identifier to the server or in the process of the server confirming the target client, or if there is a delay exceeding a predetermined time, the relevant steps are repeated. That is, the server updates the high-precision spatiotemporal identifiers 122 and transmits them to the search client 101, and high-precision spatiotemporal identifier 123 determined to be closest to the target client is returned to the server 103, and the server identifies a target client corresponding to the high-precision spatiotemporal identifier 123.

Figure 6:
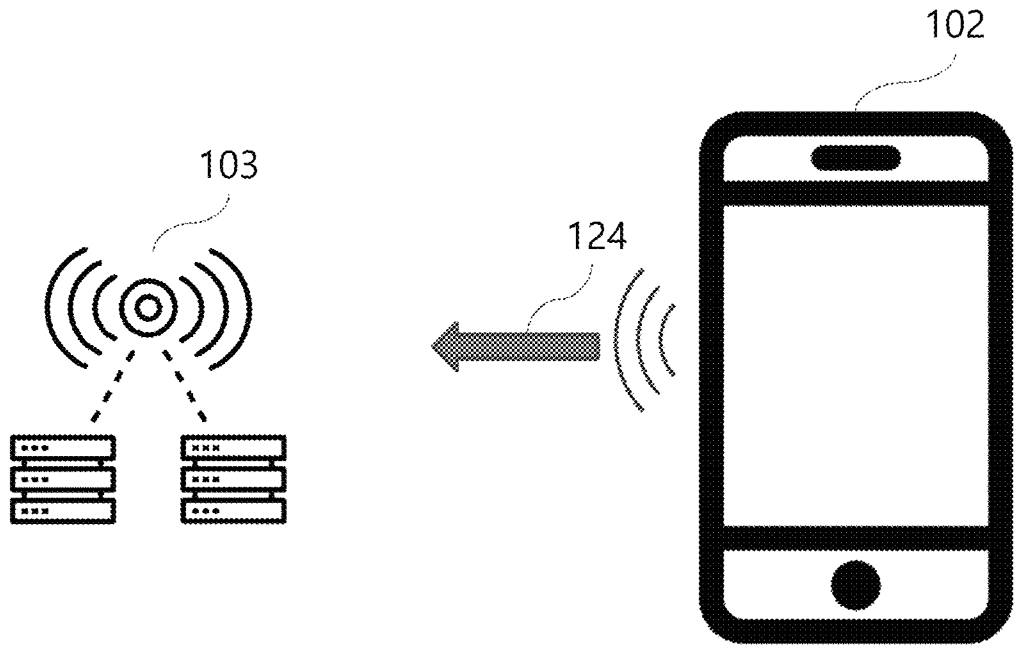
FIG. 6 is a conceptual diagram illustrating a process for verifying a target client.

If the high-precision spatiotemporal identifier is generated from a candidate client, verifying the position of the target client can optionally be performed before confirming the target client. This is because there may be an error in the high-precision spatiotemporal identifier submitted by a candidate client, and if the high-precision spatiotemporal identifier is forged or stolen, it may cause a problem connecting to an unintended client. In order to prevent this problem, as shown in FIG. 6, the server 103 requests and receives satellite observation data 124 from the selected candidate client 102, and then checks whether there is a problem with the integrity of the satellite observation data using GNSS orbit information, etc. Next, using the satellite observation data as input, the server performs a relative positioning RTK algorithm and verifies the high-precision spatiotemporal identifier. The reason for doing this is because stealing or forging satellite observation data is much more difficult than stealing or forging high-precision spatiotemporal identifiers.

Figure 7:
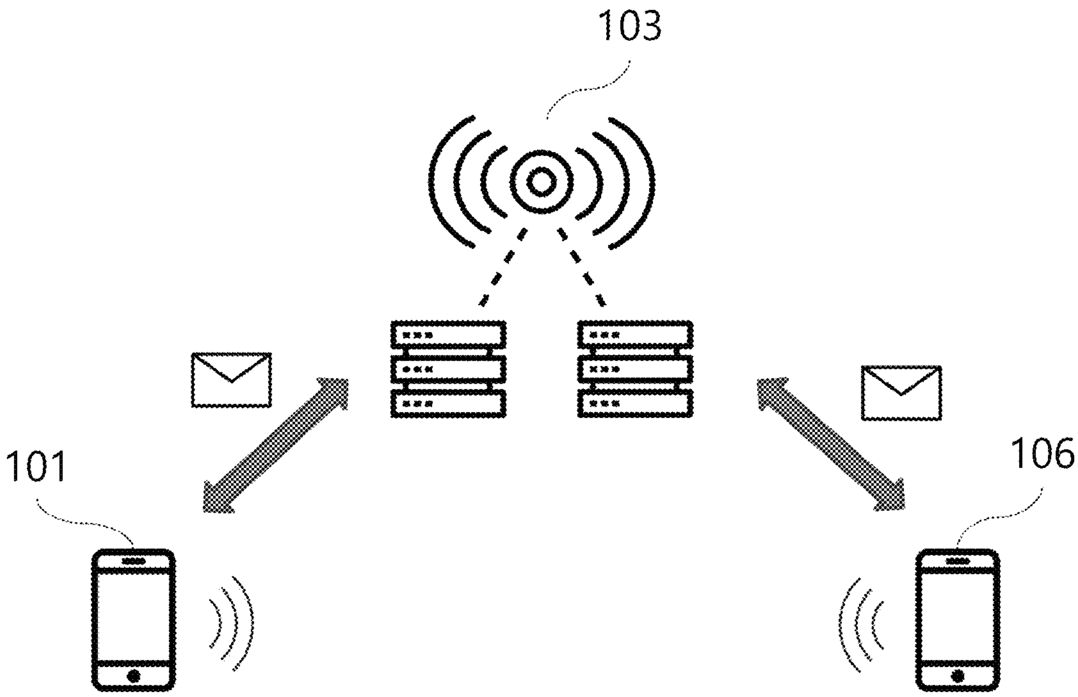
FIG. 7 is a conceptual diagram illustrating a process for providing communication means.

When confirmation of the target client is completed, the server 103 provides the search client 101 with an appropriate communication means using the user information of the target client 106. In some cases, the server 103 may provide an appropriate communication means to the target client 106 using the user information of the search client 101. As shown in FIG. 7, the server relays the communication between the search client 101 and the target client 106, so that the search client 101 and the target client 106 can communicate without revealing their user information to the other party. The server 103 can provide the clients 101 and 106 with all communications possible with Internet technology including one-to-one real-time communication such as voice calls or video calls, one-to-one messages, and one-to-many messages. Of course, the server 103 can also provide communication using other services, and can also provide high-quality and stable voice and video calls by borrowing a commercial mobile communication network.

Figure 8:
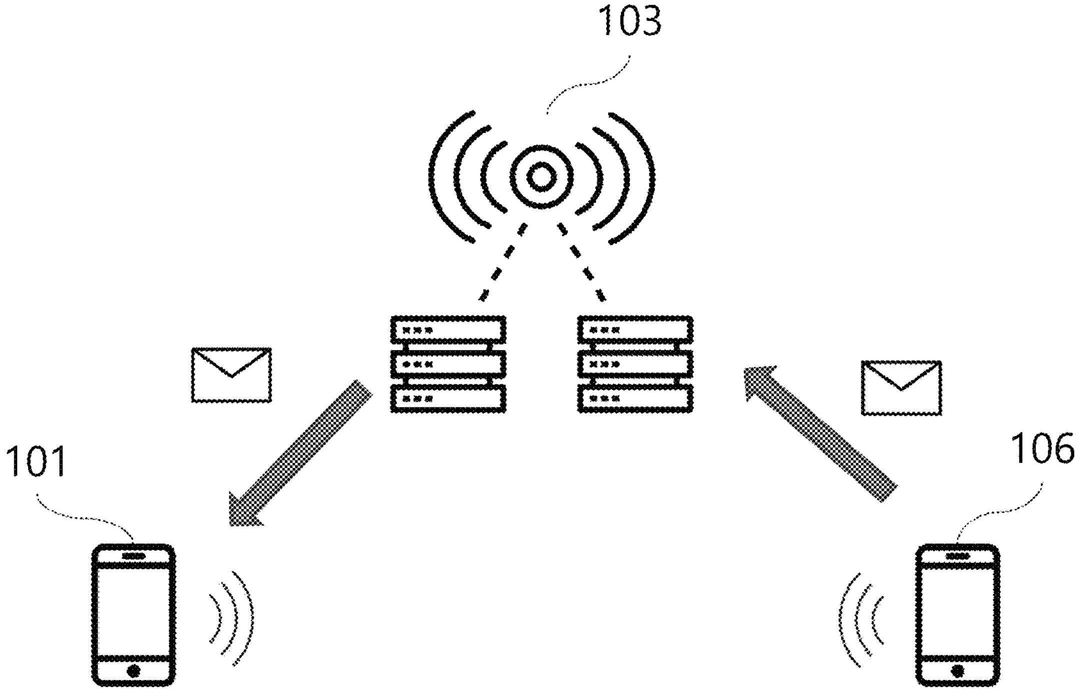
FIG. 8 is a conceptual diagram illustrating posting and accessing information.

The server 103 not only provides a communication means from the search client 101 to the target client 106, but also enables a reverse scenario in which the search client 101 receives information posted by the target client 106 as shown in FIG. 8. The client can set a posting boundary in advance on the server and manage it so that only search clients within the posting boundary can access the posted information. For example, if a client posts his business card and sets the posting boundary to be a wingspan (a short distance accepted as meeting others in person), his business card can be distributed electronically to people he actually met offline. Another example is a scenario where people gathered in a certain position use the posting of information as a means of conducting secret voting. A wide variety of scenarios can be created using real-time or non-real-time one-to-one or one-to-many communication by identifying strangers only through spatiotemporal evidence.

Figure 9:
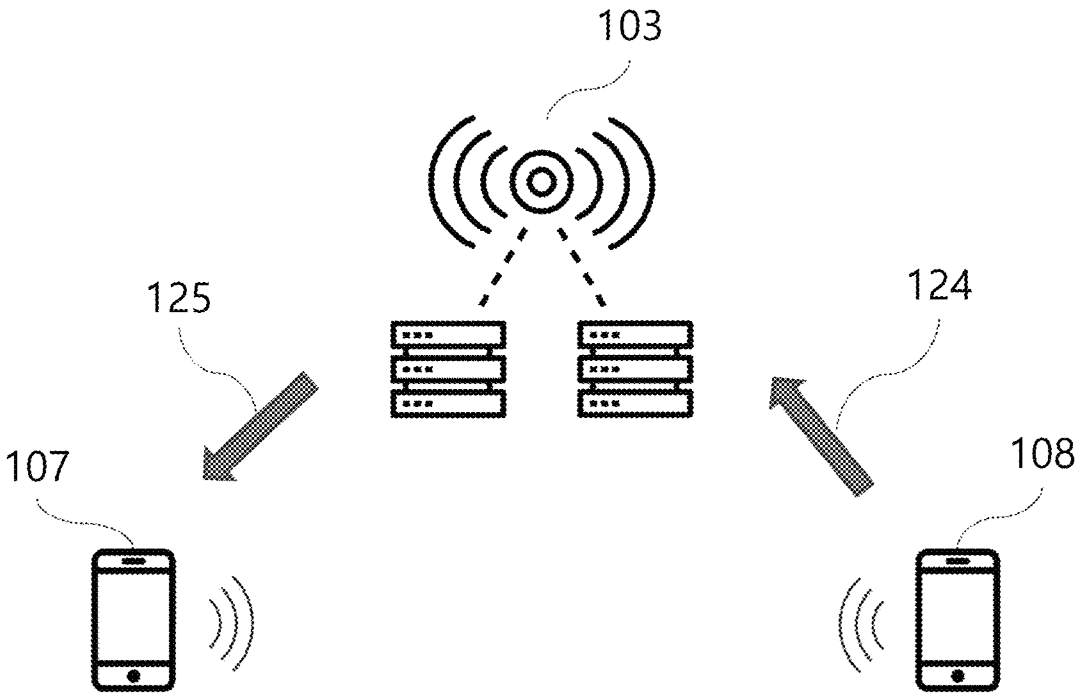
FIG. 9 is a conceptual diagram illustrating client verification by position.

The present invention can also be used to verify the authenticity of the other party in communication. In other words, risks such as voice phishing can be eliminated by identifying the position (or address) of the communication partner. As shown in FIG. 9, the server 103 receives the satellite observation data 124 of the target client 108 and performs integrity verification of the satellite observation data 124 using the actual orbit information of the GNSS (Global Navigation Satellite System) etc. As described above, satellite observation data has a high level of difficulty in being forged or stolen, so in order to utilize its safer characteristics, the server 103 requests satellite observation data 124 rather than position information from the target client 108. Then, a relative positioning RTK algorithm is performed using the satellite observation data of the RTK reference station and the target client to calculate the position (or address) of the target client 108. Forgery and falsification of position information is fundamentally prevented by having the position information generated by the server 103 rather than the target client 108.

The position information or high-precision spatiotemporal identifier 125 generated in this way is directly transmitted by the server 103 to the inquiry client 107, blocking the path through which forged or altered high-precision spatiotemporal identifiers can flow in, thereby allowing the server 103 to authenticate the position information. Depending on the service scenario, the high-precision spatiotemporal identifier 125 may be issued to the target client 108. High-precision spatiotemporal identifiers can be encrypted to defend against high-level attacks that may occur during transmission.

Figure 10:
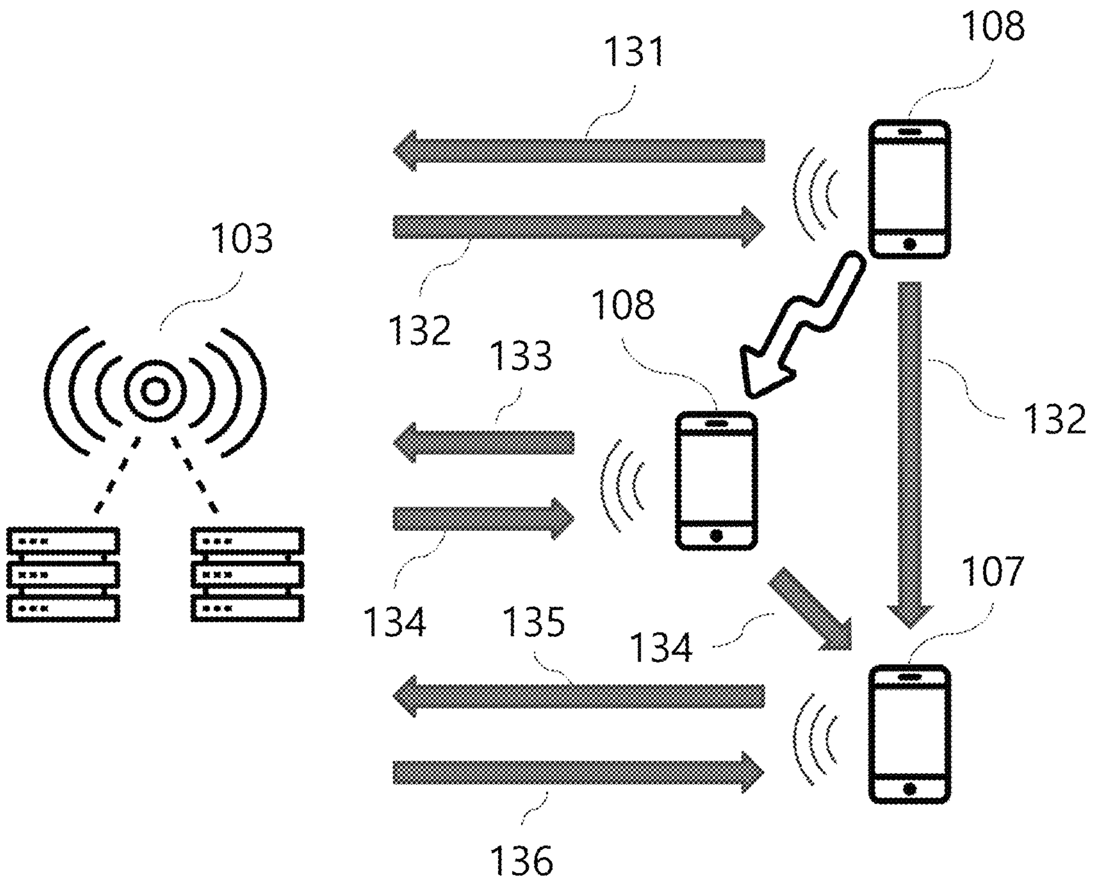
FIG. 10 is a conceptual diagram illustrating proof of client's route.

Furthermore, clients can prove to other clients the route they have taken without revealing their personal information. As shown in FIG. 10, the target client 108 submits its satellite observation data 131 to the server 103 at time 1 and position 1, and directly receives the first high-precision spatiotemporal identifier 132. The target client 108 submits its satellite observation data 133 to the server 103 at time 2 and position 2 and receives a second high-precision spatiotemporal identifier 134. The target client 108 provides the first high-precision spatiotemporal identifier 132 to the inquiry client 107 and provides the second high-precision spatiotemporal data 134 at the same time or at another time. The inquiry client 107 submits the first high-precision spatiotemporal identifier and the second high-precision spatiotemporal identifier to the server 103 and requests a proof. The server 103 confirms the first client corresponding to the first high-precision spatiotemporal identifier and the second client corresponding to the second high-precision spatiotemporal identifier, decides whether the first client and the second client are the same client and returns the proof 136. The target client 108 can prove to the inquiry client 107 that the client at time 1 and position 1 is the same as the client at time 2 and position 2 without revealing any personal information. Expanding this, the identity of entities along an entire path can be guaranteed without revealing any personal information.

Furthermore, if combined with the method shown in FIG. 9 described above, it is possible to prove not only whether entities on the path are the same but also whether the entities are the verified communication counterpart. In addition, in a situation where the inquiry client 107 is available to monitor the movement of the target client 108 in real time, it is possible for the server 103 to immediately confirm the entity identity 136 of the two high-precision spatiotemporal identifiers without transmitting the first high-precision spatiotemporal identifier 132 and the second high-precision spatiotemporal identifier 134 to the inquiry client 107. Thus, a client can prove that he or she was present at a specific place and a specific time in the past without revealing his or her personal information, so the present invention can be used for identity verification, proof of the same person, or proof of representation, etc. without using his or her personal information.

What is claimed is:

1. A computer-implemented method for providing high-precision spatiotemporal identifier services, the method comprising:

repeatedly receiving low-precision client positions from clients;

receiving an area of interest from a search client;

identifying candidate clients using low-precision client positions within the area of interest and surrounding areas according to predetermined criteria, wherein the surrounding areas include an area expanded from the area of interest by a predetermined standard to account for errors in the low-precision client positions;

confirming high-precision spatiotemporal identifiers with the candidate clients, wherein the high precision spatiotemporal identifiers are determined based on satellite observation data using a relative positioning RTK algorithm;

identifying, with the search client, one or more target clients among the candidate clients using the high-precision spatiotemporal identifiers; and making a call or delivering a message between the search client and the one or more target clients.

2. The method of claim 1, wherein low-precision client positions from clients are at regular intervals.

3. The method of claim 1, wherein each of low-precision client positions from clients is reported upon difference between current low-precision client position and last reported low-precision client position exceeding a predetermined distance.

4. The method of claim 1, wherein repeatedly receiving low-precision client positions from clients comprises requesting one or more clients to report their low-precision client positions.

5. The method of claim 1, wherein the area of interest is specified using textual means.

6. The method of claim 1, wherein the area of interest is specified using graphical means on an electronic map.

7. The method of claim 1, wherein confirming the high-precision spatiotemporal identifiers with the candidate clients comprises receiving the high-precision spatiotemporal identifiers from each of the candidate clients.

8. The method of claim 1, wherein confirming the high-precision spatiotemporal identifiers with the candidate clients comprises:

receiving satellite observation data from each of the candidate clients; and performing a relative positioning RTK algorithm using the satellite observation data to obtain high-precision position of each of the candidate clients.

9. The method of claim 8, wherein performing the relative positioning RTK algorithm with the candidate clients comprises individually performing the relative positioning RTK algorithm between an RTK reference station and each of the candidate clients.

10. The method of claim 8, wherein performing the relative positioning RTK algorithm with the candidate clients comprises:

individually performing the relative positioning RTK algorithm to obtain individual distance vectors between a representative candidate client and remaining candidate clients;

performing the relative positioning RTK algorithm between an RTK reference station and the representative candidate client to obtain representative high-precision position of the representative candidate client; and determining positions of the remaining candidate clients using the individual distance vectors and the representative high-precision position.

11. The method of claim 8, wherein performing the relative positioning RTK algorithm with the candidate clients comprises:

individually performing a single point positioning algorithm for each candidate client to obtain single point positions of the candidate clients;

obtaining an average single point position by averaging the single point positions;

individually performing the relative positioning RTK algorithm to obtain individual distance vectors between a representative candidate client and remaining candidate clients;

determining representative position of the representative candidate client using the average single point position and the individual distance vectors; and determining positions of the remaining candidate clients using the representative position and the individual distance vectors.

12. The method of claim 1, wherein identifying, with the search client, the one or more target clients among the candidate clients comprises:

transmitting the high-precision spatiotemporal identifiers of the candidate clients to the search client;

receiving, from the search client, one or more target high-precision spatiotemporal identifiers among the high-precision spatiotemporal identifiers of the candidate clients; and identifying the one or more target clients corresponding to the one or more target high-precision spatiotemporal identifiers.

13. The method of claim 1, further comprising:

providing the search client with a means of communication with the target client using user information of the target client.

14. The method of claim 1, further comprising:

providing the target client with a means of communication with the search client using user information of the search client.

15. The method of claim 1, further comprising:

providing the search client with information posted by the target client.

16. The method of claim 15, wherein the search client is within a posting area registered by the target client.

17. An apparatus comprising a processor and memory and a set of instructions enabling the processor to:

repeatedly receive low-precision client positions from clients;

receive an area of interest from a search client;

identify candidate clients using low-precision client positions within the area of interest and surrounding areas according to predetermined criteria, wherein the surrounding areas include an area expanded from the area of interest by a predetermined standard to account for errors in the low-precision client positions;

confirm high-precision spatiotemporal identifiers with the candidate clients, wherein the high precision spatiotemporal identifiers are determined based on satellite observation data using a relative positioning RTK algorithm;

identify, with the search client, one or more target clients among the candidate clients using the high-precision spatiotemporal identifiers; and make a call or deliver a message between the search client and the one or more target clients.

18. The apparatus of claim 17, further comprising instructions enabling the processor to request one or more clients to report their low-precision client positions.

19. The apparatus of claim 17, wherein the area of interest is specified using textual means.

20. The apparatus of claim 17, wherein the area of interest is specified using graphical means on an electronic map.

21. The apparatus of claim 17, further comprising instructions enabling the processor to receive the high-precision spatiotemporal identifiers from each of the candidate clients.

22. The apparatus of claim 17, further comprising instructions enabling the processor to:

receive satellite observation data from each of the candidate clients; and perform a relative positioning RTK algorithm using the satellite observation data to obtain high-precision position of each of the candidate clients.

23. The apparatus of claim 22, further comprising instructions enabling the processor to individually perform the relative positioning RTK algorithm between an RTK reference station and each of the candidate clients.

24. The apparatus of claim 22, further comprising instructions enabling the processor to:

individually perform the relative positioning RTK algorithm to obtain individual distance vectors between a representative candidate client and remaining candidate clients;

perform the relative positioning RTK algorithm between an RTK reference station and the representative candidate client to obtain representative high-precision position of the representative candidate client; and determine positions of the remaining candidate clients using the individual distance vectors and the representative high-precision position.

25. The apparatus of claim 22, further comprising instructions enabling the processor to:

individually perform a single point positioning algorithm for each candidate client to obtain single point positions of the candidate clients;

obtain an average single point position by averaging the single point positions;

individually perform the relative positioning RTK algorithm to obtain individual distance vectors between a representative candidate client and remaining candidate clients;

determine representative position of the representative candidate client using the average single point position and the individual distance vectors; and determine positions of the remaining candidate clients using the representative position and the individual distance vectors.

26. The apparatus of claim 17, further comprising instructions enabling the processor to:

transmit the high-precision spatiotemporal identifiers of the candidate clients to the search client;

receive, from the search client, one or more target high-precision spatiotemporal identifiers among the high-precision spatiotemporal identifiers of the candidate clients; and identify the one or more target clients corresponding to the one or more target high-precision spatiotemporal identifiers.

27. The apparatus of claim 17, further comprising instructions enabling the processor to provide the search client with a means of communication with the target client using user information of the target client.

28. The apparatus of claim 17, further comprising instructions enabling the processor to provide the target client with a means of communication with the search client using user information of the search client.

29. The apparatus of claim 17, further comprising instructions enabling the processor to provide the search client with information posted by the target client.

30. The apparatus of claim 29, wherein the search client is within a posting area registered by the target client.

31. A computer-implemented method for providing high-precision spatiotemporal identifier services, the method comprising:

receiving, by a server, satellite observation data from a client which was generated by the client;

verifying integrity of the satellite observation data using actual orbit information of GNSS (Global Navigation Satellite System);

performing, by the server, a high-precision positioning algorithm using the satellite observation data generating a high-precision spatiotemporal identifier for the client, wherein the high-precision spatiotemporal identifier includes high-precision position information and corresponding time information so that forged or altered position information from the client is blocked; and issuing the high-precision spatiotemporal identifier to reduce a risk of personal information exposure.

32. The method of claim 31, further comprising:

transmitting the high-precision spatiotemporal identifier to a relevant client.

33. The method of claim 31, further comprising:

storing a pair of the high-precision spatiotemporal identifier and its corresponding client ID;

retrieving two or more pairs having target high-precision spatiotemporal identifiers from stored pairs to obtain their target corresponding client IDs; and checking whether the target corresponding clients IDs are same.

34. A apparatus comprising a processor and memory and a set of instructions enabling the processor to:

receive, by the processor, satellite observation data from a client which was generated by the client;

verify integrity of the satellite observation data using actual orbit information of GNSS (Global Navigation Satellite System);

perform, by the processor, a high-precision positioning algorithm using the satellite observation data generating a high-precision spatiotemporal identifier for the client, wherein the high-precision spatiotemporal identifier includes high-precision position information and corresponding time information so that forged or altered position information from the client is blocked; and issue the high-precision spatiotemporal identifier to reduce a risk of personal information exposure.

35. The apparatus of claim 34, further comprising instructions enabling the processor to transmit the high-precision spatiotemporal identifier to a relevant client.

36. The apparatus of claim 34, further comprising instructions enabling the processor to:

store a pair of the high-precision spatiotemporal identifier and its corresponding client ID;

retrieve two or more pairs having target high-precision spatiotemporal identifiers from stored pairs to obtain their target corresponding client IDs; and check whether the target corresponding clients IDs are same.

* * * * *